United States Patent [19]

Hansen

[11] Patent Number: 4,830,145

[45] Date of Patent: May 16, 1989

[54] LUBRICATING ARRANGEMENT FOR SLIDE ASSEMBLY

[75] Inventor: Loren F. Hansen, Lincoln, Nebr.

[73] Assignee: Outboard Marine Corporation, Waukegan, Ill.

[21] Appl. No.: 130,149

[22] Filed: Dec. 8, 1987

[51] Int. Cl.$^4$ ............................................... F16N 7/12
[52] U.S. Cl. ...................................... 184/64; 384/13; 384/26; 172/21; 184/102
[58] Field of Search ....................... 172/21, 22, 95, 93, 172/88, 84; 111/7; 184/5, 19, 22, 25, 64, 102; 384/13, 26, 29, 42, 7; 92/165 R, 167

[56] References Cited

U.S. PATENT DOCUMENTS

| | | | |
|---|---|---|---|
| 1,668,976 | 5/1928 | Peet et al. | 184/25 |
| 2,800,066 | 7/1957 | Cohrs et al. | 172/93 X |
| 3,718,209 | 2/1973 | Moslo | 184/5 |
| 4,005,913 | 2/1977 | Thomson, Jr. | 184/5 X |
| 4,603,824 | 8/1986 | McArdel | 384/29 X |

Primary Examiner—Leonard E. Smith
Attorney, Agent, or Firm—Welsh & Katz, Ltd.

[57] ABSTRACT

A slide assembly for use in supporting and guiding a reciprocating push rod or the like so as to enable reciprocating movement of the push rod while undergoing translation transverse to its longitudinal direction. The slide assembly includes a tubular slide guide which receives a slide tube therethrough having a slide housing supported transversely on an end of the slide tube externally of the slide guide, the slide housing having an axial passage to receive the reciprocating rod. TEFLON bearings are interposed between the slide housing and the reciprocating rod and between the slide guide and the slide tube, and lubricating fluid felts are supported within the slide housing so as to maintain a lubricating film on the reciprocating rod. The slide assembly finds particular application in a turf aerator of the vertical reciprocating tine type wherein the tines are caused to move transverse to their longitudinal axes during reciprocation.

7 Claims, 2 Drawing Sheets

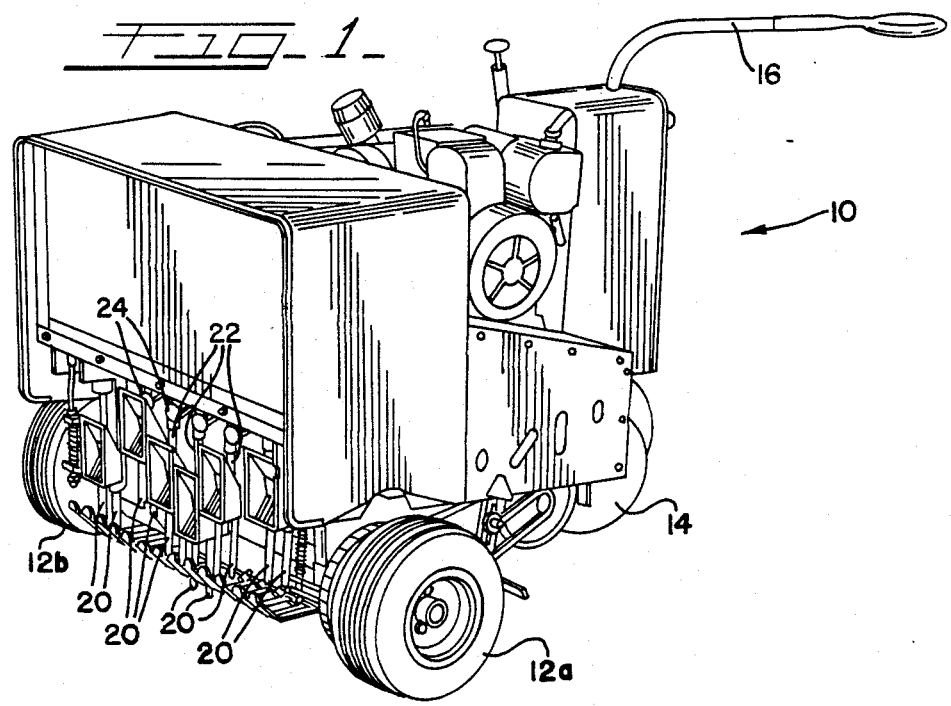
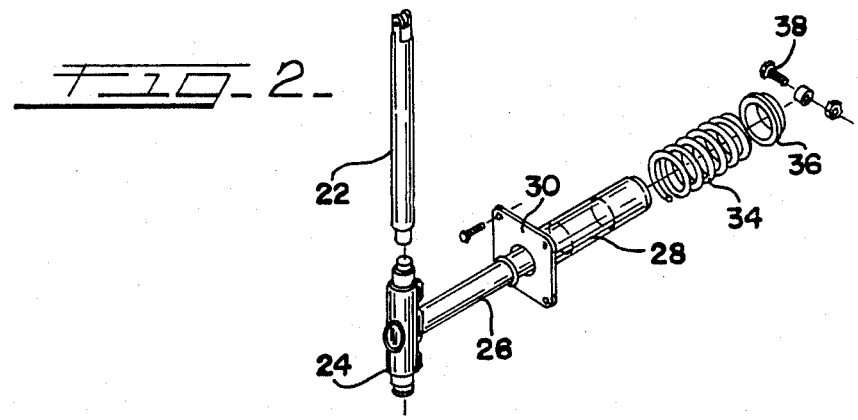
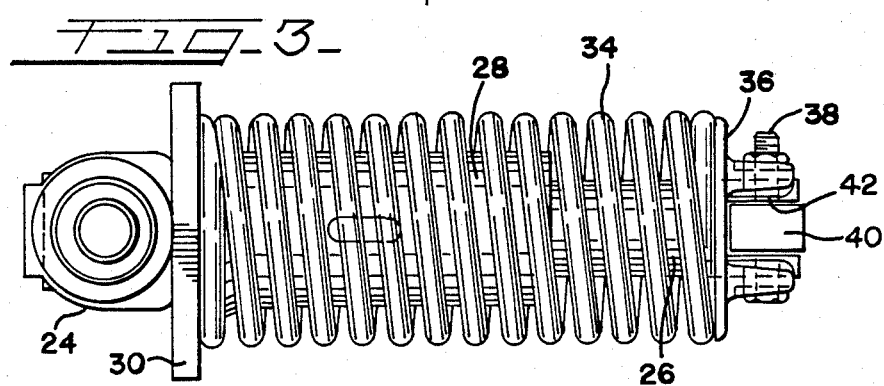

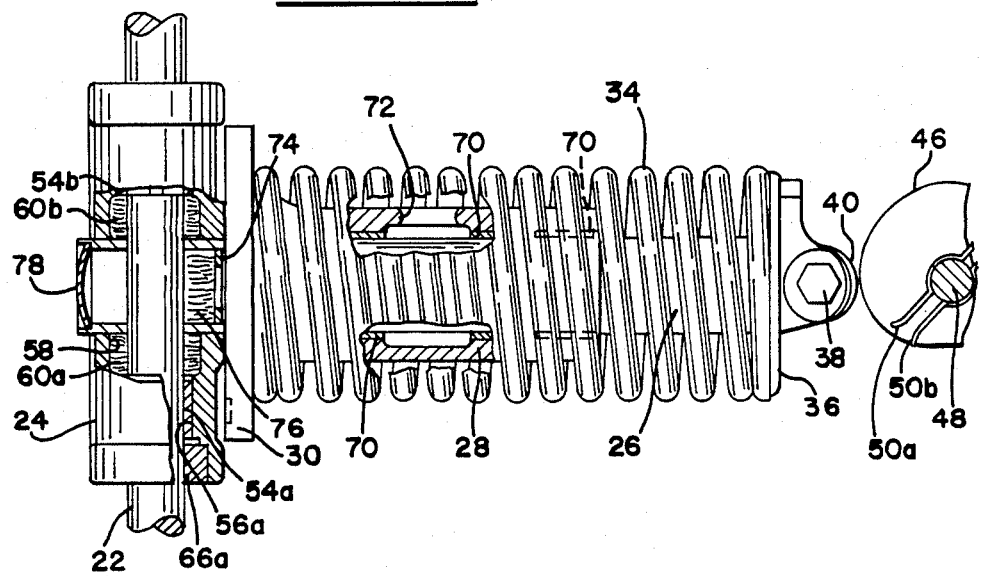
Fig-4-
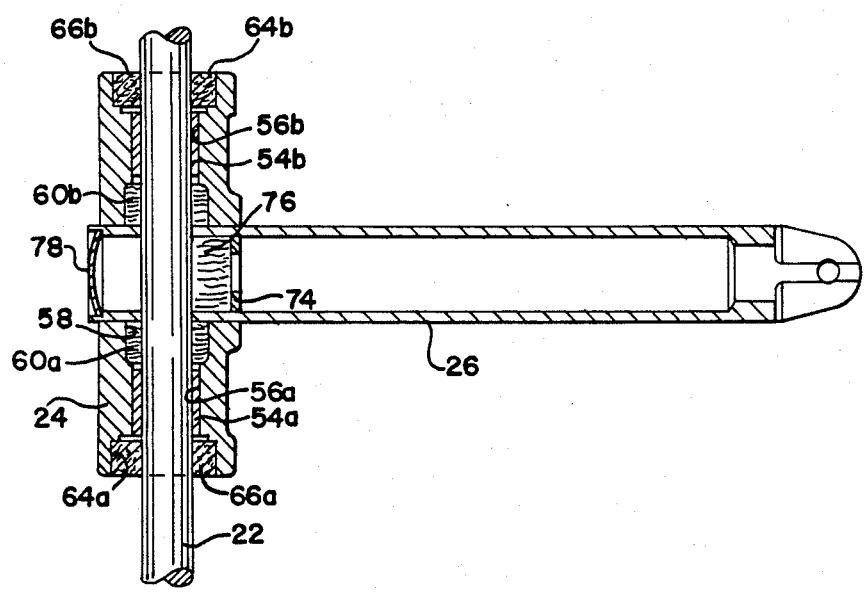
Fig-5-

LUBRICATING ARRANGEMENT FOR SLIDE ASSEMBLY

BACKGROUND OF THE INVENTION

The present invention relates generally to lubricating systems, and more particularly to a novel lubricating arrangement for use in a slide assembly for push rods as employed in vertically reciprocating coring tine type turf aerators.

Various types of mechanical apparatus employ push rods or the like which are guided for generally rectilinear reciprocating movement within a slide housing. Conventionally, sleeve bearings or bushings are supported within the slide housing to provide a bearing surface for the reciprocating push rod. The bushings are frequently made of bronze while the slide housing is made of lightweight aluminum or the like. Frequently the push rod is provided with a hardened external wear surface, such as a chrome surface, to provide longer life between the sliding bearing surfaces. Such push rod and guide housing assemblies are utilized, for example, in vertical reciprocating tine type turf aerators wherein generally vertically oriented push rods are caused to reciprocate within housings which in turn are caused to simultaneously undergo horizontal motion so that the turf penetrating tine carried on the lower end of each push rod remains laterally stationary during forming of air holes as the aerator traverses the turf.

While such prior push rod and associated guide housing assemblies have been generally satisfactory, wear has been experienced between the push rods and associated bushing type bearings which, depending upon the frequency of use and forces to which the push rods are subjected during aeration, may result in more frequent maintenance than is desirable.

SUMMARY OF THE INVENTION

One of the primary objects of the present invention is to provide a novel lubricating arrangement for a reciprocating rod and associated slide housing which results in reduced wear and longer life than has heretofore been obtainable.

A more particular object of the present invention is to provide a novel lubricating arrangement for a slide assembly having a slide housing which receives a push rod for longitudinal reciprocating movement while the slide housing is caused to undergo reciprocating movement in a direction transverse to the longitudinal axis of the push rod.

Another object of the present invention is to provide a novel lubricating arrangement for a slide/guide assembly as employed in a turf aerator wherein a push rod carrying a turf penetrating tine at its lower end is supported for vertical reciprocating movement within a slide housing which, in turn, is fixed on an end of a slide tube caused to undergo reciprocating movement in a direction transverse to the axis of the push rod, the lubricating arrangement including nonmetallic sleeve bearings interposed between the push rod and the slide housing and between the slide tube and a coaxial guide sleeve, and felt wicks operative to apply lubricating oil to the bearing contact push rod and slide tube surfaces so as to provide substantially longer wear life than has heretofore been obtainable for similar slide assemblies.

Further objects and advantages of the invention, together with the organization and manner of operation thereof, will become apparent from the following detailed description of the invention when taken in conjunction with the accompanying drawings wherein like reference numerals designate like elements throughout the several views.

BRIEF DESCRIPTION OF THE DRAWINGS

FIG. 1 is a perspective view of a turf aerator of the vertically reciprocating tine type employing the present invention;

FIG. 2 is an exploded perspective view illustrating a slide and guide assembly of the type employed in the aerator of FIG. 1 and incorporating a lubricating arrangement in accordance with the invention;

FIG. 3 is a plan view of the slide and guide assembly of FIG. 2 but shown in assembled relation;

FIG. 4 is a side elevational view of the slide and guide assembly of FIG. 3 but with portions broken away for purposes of clarity; and FIG. 5 is a longitudinal sectional view of the guide housing and associated slide tube employed in the guide and slide assembly of FIG. 4.

DETAILED DESCRIPTION

Referring now to the drawings, and in particular to FIG. 1, the present invention is illustrated, by way of example, on a turf aerator indicated generally at 10. The turf aerator 10 is of generally known design, such as commercially available from Outboard Marine Corporation as its GREENSAIRE model, although as will be apparent, the present invention may also be employed in other machines or apparatus. The turf aerator 10 is of the selfpropelled type and has turf engaging laterally spaced drive wheels 12a and 12b and a rearward wheel 14 steerable through a suitable control handle 16.

The turf aerator 10 is of the generally vertically reciprocating tine type wherein a plurality of laterally aligned preferably tubular turf penetrating tines 20 are supported, respectively, on the lower ends of vertically reciprocating push rods 22 such that upon reciprocating movement of the push rods, the tines are caused to penetrate the turf surface and effect removal of turf cores or plugs as the aerator is caused to traverse a turf surface.

Referring particularly to FIG. 2, taken in conjunction with FIGS. 3-5, each push rod 22 is supported and guided for generally vertical reciprocating movement by a slide assembly which includes a slide housing 24. Each slide housing 24 may be formed from cast aluminum or the like and is affixed to and supported on an end of an elongated cylindrical slide tube 26 which is caused to undergo longitudinal reciprocating movement in a direction substantially transverse to the longitudinal axis of the corresponding push rod 22 and in predetermined relation to reciprocating movement of the associated push rod. The slide tube 26 is supported for longitudinal reciprocating movement within a tubular slide guide or sleeve 28 affixed at its forward end to a transverse rectangular shaped mounting plate 30 having a center circular opening to receive the slide tube 26 therethrough. The mounting plate 30 facilitates mounting of the slide assemblies on a cam case housing (not shown) within the turf aerator 10 such that the axes of the push rods 22 lie substantially in a common vertical plane transverse to the longitudinal axis of the aerator, such plane thus being parallel to the rotational axis of the wheels 12a and 12b. The mounting plates 30 and associated slide guides or sleeves 28 are supported by the cam case housing such that the slide guides extend into the cam case in parallel relation to the longitudinal axis of the aerator. The slide tubes 26 are adapted to be longitudinally reciprocated within their associated slide guides 28 so as to effect a corresponding lateral or horizontal movement of the associated slide housings 24 and push rods 22 which, as illustrated in FIGS. 4 and 5, extend through a longitudinal bore or passage formed within the slide housing and through a suitable transverse opening formed in the end of the slide guide affixed within the slide housing. A coil compression spring 34 is coaxial about each of the slide guides 28 and acts between the associated mounting plate 30 and a suitable spring retainer 36 affixed to an end of the slide tube 26 opposite the slide housing 24 through a screw 38 which extends through axially aligned openings in the spring retainer and corresponding end of the slide tube. The springs 34 bias the slide tubes 26 to rearward positions wherein the associated slide housings 24 abut the mounting plates 30. The shank of each screw 38 rotatably supports a cylindrical cam follower 40 received within a suitable recess 42 formed in the corresponding end of the slide tube 26 as illustrated in FIG. 3. Each cam follower 40 has operative association with an associated cam plate, as shown fragmentarily at 46 in FIG. 4, which is mounted on a cam shaft 48 within the aforementioned cam case housing within the aerator 10. The cams 46 are rotatably driven so as to effect predetermined longitudinal reciprocating movement of the associated slide tubes 26 relative to their associated slide guides or sleeves 28. The cam case housing encases the cams 46 and associated pairs of oil slingers 50a,b which are rotatable with the cams and sling lubricating oil lying in the cam case as will be described.

During operation of the aerator 10 as thus far described, rotation of the cams 46 effects predetermined reciprocation of the slide tubes 26 and causes the slide housings 24 to undergo selective lateral or substantially horizontal movement while the associated push rods 20 undergo vertical reciprocating movement by means of suitable crank shaft and connecting rod assemblies (not shown) associated with the push rods. The cams 46 are configured to effect generally horizontal motion of the slide housings 24 in predetermined relation with vertical reciprocating movement of the associated push rods such that the corresponding turf aerating tines 20 remain substantially laterally stationary during penetration into and withdrawal from the turf surface. In accordance with past practice, the push rods 22 and slide tubes 26 have had chrome surfaces formed thereon for sliding reciprocating movement within associated bronze bushings supported within the corresponding slide housings 24 and slide guides for sleeves 28.

In accordance with the present invention, nonmetallic bearings in the form of TEFLON synthetic resin sleeve bearings are supported within each slide housing 24 and slide guide or sleeve 28 so as to form bearing surfaces between the slide housing and slide guide and the associated push rods 22 and slide tubes 26. Referring particularly to FIGS. 4 and 5, a pair of cylindrical TEFLON sleeve bearings 54a and 54b are suitably affixed within axially aligned bore surfaces 56a and 56b in the slide housing so as to receive the corresponding push rod 22 in sliding relation. A generally centrally located larger diameter recess 58 is formed within the slide housing 24 between the TEFLON bearings 54a,b and receives a pair of annular lubricating felts or wicking oilers 60a and 60b which engage the outer peripheral surface of the push rod 22 extending through the slide housing. The opposite ends of the slide housing 24 are recessed or counterbored at 64a and 64b, respectively, to receive and support suitable annular seals 66a and 66b, respectively, which seal against the outer cylindrical surface of the corresponding push rod and prevent discharge of lubricant as will be described.

Referring again to FIG. 4, each slide guide 28 carries a plurality of annular nonmetallic bearings in the form of TEFLON bearings 70 which receive the outer peripheral surface of the associated slide tubes 26 in sliding relation. At least one elongated opening, such as indicated at 72, is formed through the wall of the slide guide 28 to receive lubricating oil slung from the oil slingers 50a and 50b for lubricating the outer peripheral surface of the slide tube and thereby continually lubricating the TEFLON bearings 70 interposed between the slide guide and associated slide tube.

As the oil slingers 50a and 50b rotate with the associated drive cams 46, oil droplets are slung into the adjacent ends of the tubular slide tubes 26 whereupon the lubricating oil passes along the slide tubes and through an annular star washer 74 which retains a lubricating felt or wicking oiler member 76 against the outer surface of the associated push rod 22. A suitable transverse plug or cap 78 is affixed within the outer end of each slide tube 26 opposite its cam follower 40 and defines with the associated felt or oil wicking member 76 a lubricating oil reservoir peripherally of the reciprocating push rod 22. It will be appreciated that the wicking member 76 also acts as a filter to prevent the infiltration of contaminants into the aforementioned cam case if and when the seals 66a and 66b fail.

During operation of the turf aerator 10, the push rods 22 and associated coring tines 20 are caused to undergo vertical reciprocation while guided within the associated slide housings 24. As aforementioned, during such vertical reciprocating movement of the push rods 22, the associated cams 46 are caused to rotate to effect predetermined reciprocating movement of the slide tubes 26 within their slide guides 28 against the action of the coil springs 34 to effect generally horizontal movement of the slide housings 24. Reciprocating movement of the slide tubes is effected in predetermined relation with longitudinal reciprocating movement of the push rods such that the coring tines remain substantially stable and normal to the turf surface and do not undergo substantial lateral horizontal movement during entry into and withdrawal from the turf surface, thus effecting minimal disturbance or displacement of the turf peripherally of the aerating hole formed upon removal of a turf core or plug and minimizing the force required to effect tine penetration and withdrawal. During such rotation of the cams 46, the oil slingers 50a and 50b sling oil droplets through the elongated opening 72 to lubricate the outer surface of the reciprocating slide tube and associated TEFLON bearings 70. Simultaneously, oil droplets are caused to flow longitudinally through the tubular slide tubes and impregnate the lubricating felt wicking element 76 to lubricate the outer peripheral surface of the associated push rod 22. Lubricating oil thus carried on the outer surface of the push rod wets the lubricating felts 60a and 60b which further facilitates lubricating the outer surface of the push rod and the interface between the push rod and nonmetallic bearings 54a and 54b. The push rods 22 and slide tubes 26 are preferably subjected to low temperature heat treatment so as to obtain slightly porous surfaces. The lubricating oil is thus better carried to the TEFLON bearings 54a,b and 70. The slightly porous surfaces of the push rods and slide tubes which slidably engage the corresponding TEFLON bearings also may retain TEFLON from the associated Teflon bearings so as to create TEFLON-to-TEFLON bearing surfaces, thereby further enhancing wear and prolonging the life of the slide/guide assemblies.

Thus, in accordance with the present invention, it will be appreciated that an improved lubricating arrangement is provided for a slide and guide assembly which finds particular application in vertically reciprocating tine type turf aerators, although other applications of the lubricating arrangement will become readily apparent. While a preferred embodiment of the present invention has been illustrated and described, it will be understood that changes and modifications may be made therein without departing from the invention in its aspects. Various features of the invention are defined in the following claims.

What is claimed is:

1. A slide assembly for guiding reciprocating movement of a cylindrical shaft comprising a slide housing having an axial passage therethrough adapted to receive a cylindrical shaft, said slide housing having a transverse bore formed therethrough intersecting said axial passage, a slide tube affixed within said transverse bore through said slide housing and adapted to accommodate reciprocating movement of the cylindrical shaft, said slide tube extending radially from said slide housing, a slide guide mounted coaxially on said slide tube and enabling reciprocating movement of said slide tube relative to said slide guide, first nonmetallic bearing means supported within said slide housing peripherally of said axial passage therethrough so as to engage the outer peripheral surface of the cylindrical shaft when extending through the axial passage, second nonmetallic bearing means interposed between said slide guide and said slide tube and defining a sliding bearing surface with said slide guide while enabling longitudinal movement thereof relative to said slide guide, spring means operatively associated with said slide guide and said slide tube and urging said slide tube toward a first position relative to said slide guide while enabling longitudinal reciprocating movement of said slide tube relative to said slide guide, and lubricating oil wicking means supported within said slide housing so as to effect lubrication of the outer peripheral surface of the cylindrical shaft when exposed to a fluid lubricant.

2. A slide assembly for use in guiding reciprocating movement of a cylindrical shaft, said slide assembly comprising a tubular slide guide defining an internal substantially cylindrical passage therethrough, an elongated slide tube extending coaxially through said slide guide, a slide housing supported on an end of said slide tube externally of said slide guide, said slide housing defining a substantially axial passage therethrough transverse to the longitudinal axis of said slide tube, said axial passage being adapted to receive a cylindrical shaft therein for longitudinal reciprocating movement, first nonmetallic bearing means interposed between said slide guide and said slide tube and defining a bearing surface for said slide tube, second nonmetallic bearing means supported within said slide housing peripherally of said axial passage and defining bearing surface means for slidingly receiving the cylindrical shaft, said slide guide having at least one lubricating opening formed therein exposing the outer surface of the slide tube and enabling application of a lubricating fluid thereto, and lubricating fluid wicking means supported within said slide housing so as to enable application of a lubricating fluid to the outer peripheral surface of a cylindrical shaft received through said axial opening in sliding relation with said nonmetallic bearings, said slide tube defining a lubricating oil passage having communication with said lubricating wicking means within said slide housing.

3. A slide assembly as defined in claim 2 including annular seal means supported at the opposite ends of said slide housing so as to prevent discharge of lubricating oil from said axial passage.

4. A slide assembly as defined in claim 2 including a lubricating felt supported within said slide tube adjacent said axial passage through said slide housing so as to effect application of lubricating fluid against the outer surface of the cylindrical shaft passing through said axial passage when said lubricating felt is exposed to lubricating fluid.

5. A slide assembly as defined in claim 2 wherein said nonmetallic bearings comprise TEFLON sleeve bearings.

6. A slide assembly as defined in claim 2 wherein said slide tube is formed with a porous outer peripheral surface to facilitate transfer of lubricating oil to said first non-metallic bearing means.

7. A slide assembly as defined in claim 6 including a pushrod adapted for longitudinal reciprocating movement within said axial passage through said slide housing, said pushrod having a slightly porous outer peripheral surface to facilitate transfer of lubricating oil from said lubricating fluid wicking means to said second non-metallic bearing means.

* * * * *